US010226827B2

(12) United States Patent
Emch

(10) Patent No.: US 10,226,827 B2
(45) Date of Patent: Mar. 12, 2019

(54) HAND-HELD POWER-TOOL FOOTPLATE APPARATUS

(71) Applicant: Robert Bosch GmbH, Stuttgart (DE)

(72) Inventor: Ferdinand Emch, Brügglen (CH)

(73) Assignee: Robert Bosch GmbH, Stuttgart (DE)

( * ) Notice: Subject to any disclaimer, the term of this patent is extended or adjusted under 35 U.S.C. 154(b) by 232 days.

(21) Appl. No.: 14/274,864

(22) Filed: May 12, 2014

(65) Prior Publication Data

US 2014/0360027 A1    Dec. 11, 2014

(30) Foreign Application Priority Data

Jun. 11, 2013 (DE) .................... 10 2013 210 849

(51) Int. Cl.
*B23D 49/00* (2006.01)
*B23D 49/16* (2006.01)
*B23D 51/02* (2006.01)

(52) U.S. Cl.
CPC ......... *B23D 49/007* (2013.01); *B23D 49/167* (2013.01); *B23D 51/02* (2013.01)

(58) Field of Classification Search
CPC .... B23D 49/167; B23D 51/02; B23D 49/007; B23D 49/14; B23D 49/162; B27B 19/002; B27B 19/006; B27B 19/02; B27B 19/04; B27B 19/09
USPC ............................ 30/376, 374, 373, 375, 377
See application file for complete search history.

(56) References Cited

U.S. PATENT DOCUMENTS

| 3,087,519 A * | 4/1963 | McCarty ............. B23D 49/167 30/373 |
| 3,938,251 A * | 2/1976 | Kareman ............. B23D 49/167 30/376 |
| 5,239,756 A | 8/1993 | Matzo et al. |
| 5,414,935 A | 5/1995 | Braunbach et al. |
| 5,570,511 A | 11/1996 | Reich et al. |
| 5,727,322 A * | 3/1998 | Giacometti .......... B23D 49/167 30/376 |
| 2002/0000046 A1 | 1/2002 | Hartmann |
| 2004/0168561 A1 | 9/2004 | Tam et al. |
| 2007/0000368 A1 | 1/2007 | Powell et al. |
| 2009/0077819 A1 * | 3/2009 | Kuehne ................ B23D 49/167 30/392 |
| 2013/0019483 A1 | 1/2013 | Naughton et al. |

FOREIGN PATENT DOCUMENTS

| DE | 19546162 A1 * | 6/1996 | ........... B23D 49/167 |
| DE | 19926387 A1 * | 12/2000 | ........... B23D 49/167 |
| DE | 102009055860 A1 * | 6/2011 | ............. B23D 51/02 |

(Continued)

Primary Examiner — Jennifer B Swinney
(74) Attorney, Agent, or Firm — Maginot, Moore & Beck LLP

(57) ABSTRACT

A hand-held power-tool footplate apparatus for portable power tools includes at least one main body unit configured to be removably positioned on a power-tool housing of a portable power tool, at least one housing abutment configured to abut against the power-tool housing, and at least one clamping surface located on a side that faces away from the housing abutment of the main body unit. The main body unit has a multi-point position fixing unit which has at least two pivot locking stops that differ from each other and that are configured to pivot angle lock the main body unit.

5 Claims, 6 Drawing Sheets

(56) References Cited

FOREIGN PATENT DOCUMENTS

| | | | |
|---|---|---|---|
| EP | 0603552 A1 * | 6/1994 | ........... B23D 49/167 |
| EP | 1 586 399 A1 | 10/2005 | |
| EP | 2 556 910 A1 | 2/2013 | |
| FR | 2 778 589 A1 | 11/1999 | |
| WO | 2012/089434 A1 | 7/2012 | |

* cited by examiner

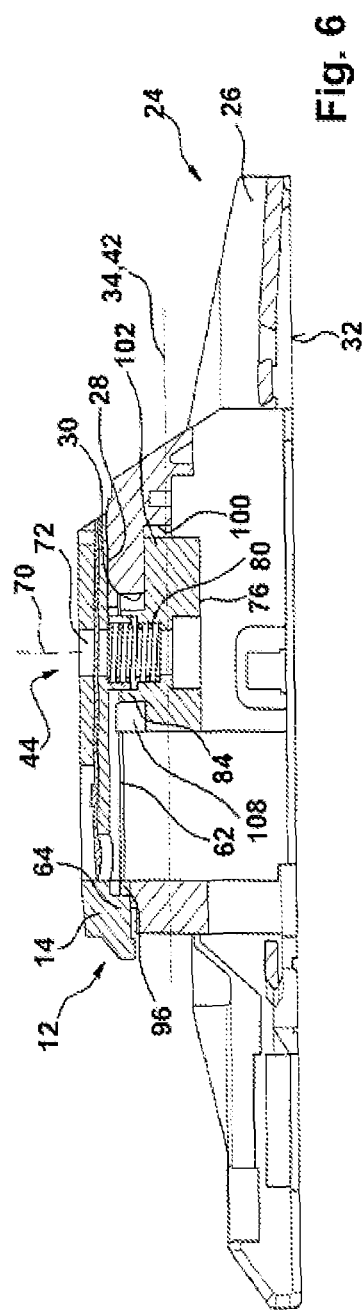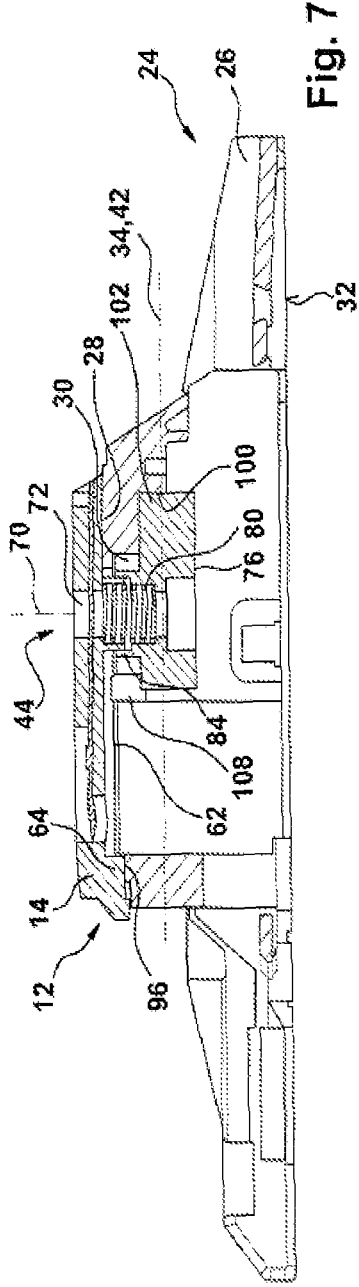

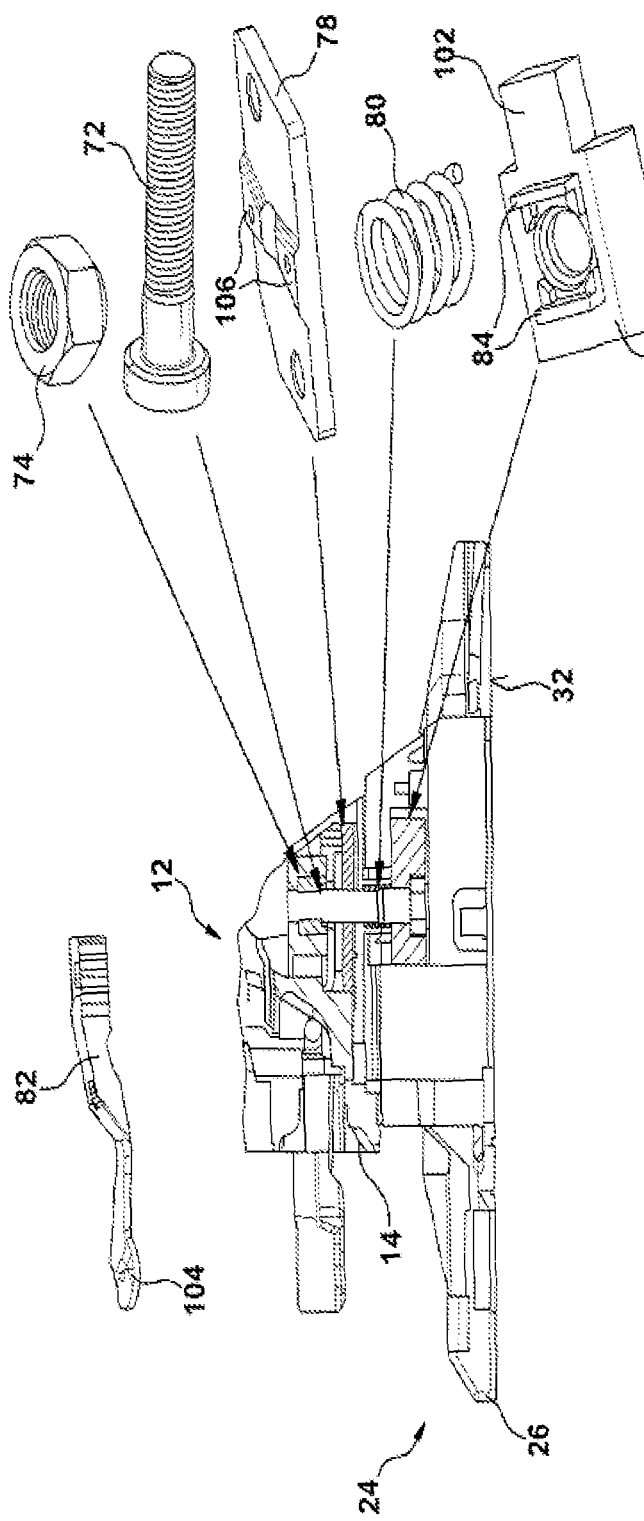

HAND-HELD POWER-TOOL FOOTPLATE APPARATUS

This application claims priority under 35 U.S.C. § 119 to patent application no. DE 10 2013 210 849.4, filed on Jun. 11, 2013 in Germany, the disclosure of which is incorporated herein by reference in its entirety.

BACKGROUND

Hand-held power-tool footplate apparatuses for portable power tools, in particular for jigsaws, are already known which comprise a main body unit which can be removably arranged on a power-tool housing of a portable power tool and which has a housing abutment, for abutment against the power-tool housing, and at least one clamping surface which is arranged on a side, which faces away from the housing abutment, of the main body unit.

SUMMARY

The disclosure relates to a hand-held power-tool footplate apparatus for portable power tools, in particular for jigsaws, having at least one main body unit which can be removably arranged on a power-tool housing of a portable power tool and which has at least one housing abutment, for abutment against the power-tool housing, and at least one clamping surface which is arranged on a side, which faces away from the housing abutment, of the main body unit.

It is proposed that the main body unit comprises, for a right-angled orientation in at least a state in which the main body unit is arranged on the power-tool housing, a multi-point position fixing unit which, for pivot angle locking of the main body unit, has at least two pivot locking stops that differ from one another. The pivot locking stops may be designed to differ from one another with regard to an arrangement on the main body unit and/or with regard to a geometric configuration. Here, the multi-point position fixing unit is preferably provided for limiting or restricting a movement capability of the main body unit relative to the power-tool housing in at least a state in which the main body unit is arranged on the power-tool housing. The main body unit is preferably mounted such that, in at least a state in which it is arranged on the power-tool housing, it is pivotable relative to the power-tool housing. It is particularly preferable for the housing abutment to be designed so as to differ from a centering element, in particular a cam receiving element. The centering element is preferably formed by a cam receiving element of the main body unit, which cam receiving element, for centering and/or for a symmetrical and/or right-angled orientation of the main body unit in at least a state in which the latter is arranged on the power-tool housing, interacts with a cam of the power-tool housing. The cam receiving element is preferably arranged on a main body of the main body unit, and is in particular formed integrally with the main body. The expression "right-angled orientation" is intended here in particular to define an orientation of the main body unit, in at least a state in which the main body unit is arranged on the power-tool housing, relative to the power-tool housing in which a support surface of the main body unit is oriented at least substantially perpendicular to a vertical axis, in particular to a stroke axis, of the portable power tool.

The expression "housing abutment" is to be understood here in particular to define an element which, in at least a state in which the main body unit is arranged on the power-tool housing, is in direct contact with a counterpart abutment of the power-tool housing of the portable power tool and which is provided such that, by means thereof, forces acting on the main body unit are supported on the power-tool housing and/or such that forces acting on the power-tool housing are supported via the main body unit. The housing abutment may in this case be in the form of an abutment point, an abutment line, an abutment surface etc. It is preferable for the housing abutment to be formed integrally with the main body of the main body unit. It is however also conceivable for the housing abutment to be formed separately from the main body of the main body unit and to be fixed to the main body of the main body unit by means of a connection type that would appear expedient to a person skilled in the art, for example a positively locking, a non-positively locking and/or an adhesive connection. "Integral" should be understood in particular to mean at least cohesively connected, for example by means of a welding process, an adhesive bonding process, an injection moulding process and/or some other process that would appear expedient to a person skilled in the art, and/or should advantageously be understood to mean formed in one piece, for example by way of production from one casting and/or by way of production in a single-component or multi-component injection-moulding process, and advantageously from a single blank.

The clamping surface is preferably provided to interact, in order to fixedly clamp the main body unit in at least a state in which the latter is arranged on the power-tool housing, with a fixing element of a fixing unit of the hand-held power-tool footplate apparatus or of the portable power tool. It is particularly preferable for the clamping surface to interact, in order to fixedly clamp the main body on the power-tool housing, with the fixing element, which is in the form of a clamping element, of the fixing unit. Here, the clamping surface is preferably arranged on an inner side, which faces toward a support surface of the main body unit, of an abutment element, which is in the shape of a segment of a circular cylindrical ring, of the main body unit. It is preferably the case that, in at least a state in which the main body unit is arranged on the power-tool housing, the abutment element in the shape of a segment of a circular cylindrical ring abuts, by way of a side facing away from the support surface of the main body unit, against the power-tool housing. It is thus preferably the case that a surface, in particular a surface facing away from the support surface, of the abutment element in the shape of a segment of a circular cylindrical ring forms the housing abutment of the main body unit. Here, the expression "support surface" should be understood in particular to mean a surface of the main body unit, in particular of the main body of the main body unit, by which, in at least a state in which the main body unit is arranged on the power-tool housing, the main body unit can abut against or be supported on a surface, in particular on a workpiece surface of a workpiece that is to be machined using the portable power tool. The support surface of the main body unit is preferably arranged on a side, which faces away from the housing abutment, of the main body unit, in particular of the main body. By means of the configuration according to the disclosure of the hand-held power-tool footplate apparatus, it is advantageously possible to realize precise orientation of the main body unit in at least a state in which the main body unit is arranged on the power-tool housing. It is advantageously possible, in the case of a main body unit which is designed so as to be adjustable in terms of position relative to the power-tool housing, to advantageously achieve a precise, correctly angled orientation of the main body unit in at least a state in which the main body unit is arranged on the power-tool housing, in particular in a state in which said main body unit is fixedly clamped to the power-tool housing by means of the fixing unit.

It is also proposed that the main body unit comprises at least one bearing element which is provided for mounting the main body unit, in order to permit a movement into a pivot angle locking position and/or into a pivot angle adjustment position, so as to be movable in translational fashion along a movement axis which runs at least substantially parallel to the support surface of the main body unit. Here, the expression "mounting so as to be movable" is intended to define in particular a mounting of a unit and/or of an element wherein the unit and/or the element, in particular in a manner decoupled from an elastic deformation and/or a tolerance-induced movement capability of the unit and/or of the element, can perform a movement along at least a distance greater than 0.5 mm, preferably greater than 1 mm and particularly preferably greater than 2 mm, and/or can perform a movement about at least one axis through an angle greater than 5°, preferably greater than 10° and particularly preferably greater than 15°. Here, "substantially parallel" should be understood in particular to mean an orientation of a direction relative to a reference direction, in particular in a plane, wherein the direction has a deviation of in particular less than 8°, advantageously less than 5° and particularly advantageously less than 2° with respect to the reference direction.

The bearing element is preferably provided for mounting the main body unit such that, for orientation in at least a state in which the latter is arranged on the power-tool housing, said main body unit is movable in translational fashion along a movement axis which runs at least substantially parallel to the support surface of the main body unit, which movement axis runs in a tool movement plane. Here, a "tool movement plane" should be understood in particular to mean a plane in which a tool holder, in particular a tool holder arranged on a reciprocating rod, of the portable power tool moves, in particular moves at least in oscillating fashion, relative to the main body unit in at least a state in which the main body unit is arranged on the power-tool housing. The fixing unit is preferably provided for fixing the main body unit, in at least a state in which the latter is arranged on the power-tool housing, in a set angular position relative to the power-tool housing. By means of the configuration according to the disclosure of the alternative hand-held power-tool footplate apparatus, it is advantageously possible to realize a precise orientation of the main body unit, in particular in a central position of the main body unit, in at least a state in which the main body unit is arranged on the power-tool housing. It is thus advantageously possible, in the case of a main body unit which is designed to be adjustable in terms of position relative to the power-tool housing, to advantageously realize a precise, correctly angled orientation of the main body unit, in particular in a central position of the main body unit, in at least a state in which the main body unit is arranged on the power-tool housing, in particular in a state in which said main body unit is fixedly clamped to the power-tool housing by means of the fixing unit.

It is also proposed that the hand-held power-tool footplate apparatus comprises at least the fixing unit, which is provided such that, by generating a fixing force, which acts on the main body unit and which is oriented in the direction of the power-tool housing, said fixing unit fixes the main body unit to the power-tool housing. The main body unit, in at least a state in which the latter is arranged on the power-tool housing, is acted on by the fixing unit in the direction of the power-tool housing with a fixing force of the fixing unit. The fixing unit preferably comprises at least one movably mounted operating element for a movement of the fixing element into a fixing position and/or into a relief position. By means of the configuration according to the disclosure, it is advantageously possible to realize a secure arrangement of the main body unit on the power-tool housing. Furthermore, it is thus advantageously possible to ensure secure abutment of the housing abutment of the main body unit against the corresponding counterpart abutment element of the power-tool housing.

It is also proposed that the fixing unit comprises at least one fixing element which interacts with the clamping surface and which has at least one locking projection for locking the main body unit in at least one angular position, in particular in a central position that corresponds to a right-angled orientation, relative to the power-tool housing by means of a positively locking connection that acts along a pivoting direction of the main body unit. It is thus advantageously possible to permit a particularly secure and stable orientation of the main body unit relative to the power-tool housing.

It is also proposed that, in at least one angular position of the main body unit relative to the power-tool housing, the locking projection bears against at least one of the pivot locking stops. It is advantageously possible, in a simple manner in terms of construction, to permit secure locking of the main body unit in a right-angled orientation on the power-tool housing.

It is also proposed that the main body unit has at least one centering element which is provided for centering the main body unit in at least a state in which the latter is arranged on the power-tool housing. The centering element is preferably in the form of a cam receiving element. It is however also conceivable for the centering element to have some other configuration that appears expedient to a person skilled in the art, for example a configuration as a cam, as a rib etc. By means of the configuration according to the disclosure of the hand-held power-tool footplate apparatus, it is advantageously possible to realize a symmetrical orientation of the main body unit, in at least a state in which the latter is arranged on the power-tool housing, relative to an axis running in the tool movement plane.

It is also proposed that the centering element forms at least one of the pivot locking stops. It is preferable for one of the pivot locking stops to be formed by at least one surface that delimits the centering element which is in the form of a cam receiving element. By means of the configuration according to the disclosure, it is advantageously possible to permit a configuration of the multi-point position fixing unit which is simple in terms of construction.

The disclosure also relates to a portable power tool having at least one hand-held power-tool footplate apparatus. The portable power tool is preferably in the form of a jigsaw. It is however also conceivable for the portable power tool to be of some other configuration that appears expedient to a person skilled in the art, for example a configuration as a router, a configuration as a hand-held circular saw etc. The hand-held power-tool footplate apparatus is thus preferably in the form of a jigsaw footplate apparatus. Here, a "portable power tool" should be understood in particular to mean a power tool for machining workpieces, which power tool can be transported by an operator without the need for a transport machine. In particular, the portable power tool has a mass of less than 40 kg, preferably less than 10 kg and particularly preferably less than 5 kg. The portable power tool preferably comprises at least one tool holder and at least the power-tool housing, which has at least one counterpart abutment surface for direct contact with the housing abutment of the main body unit, which runs at least substantially perpendicular to the tool movement plane. By means of the configuration according to the disclosure, it is advantageously possible to permit precise machining of a workpiece to be machined. It is advantageously made possible for cuts to be formed in a precise manner into a workpiece to be machined.

The disclosure also relates to a hand-held power tool system having at least one portable power tool according to the disclosure and having at least one further hand-held power-tool footplate apparatus which can be arranged on the power-tool housing alternatively to the hand-held power-tool footplate apparatus according to the disclosure, wherein the further hand-held power-tool footplate apparatus has at least one main body unit which can be removably arranged on the power-tool housing of the portable power tool and which has at least one housing abutment, for abutment against the power-tool housing, and at least one clamping surface which is arranged on a side, which faces away from the housing abutment, of the main body unit.

It is thus advantageously possible to permit a high level of flexibility of the portable power tool. Furthermore, a conversion of the portable power tool with a hand-held power-tool footplate apparatus that is adjustable in terms of position into a portable power tool having a hand-held power-tool footplate apparatus that is not adjustable in terms of position can be made possible with little outlay. It is thus advantageously possible by means of the hand-held power tool system according to the disclosure to permit a broad range of machining usage variants.

It is also proposed that the main body unit of the further hand-held power-tool footplate apparatus has, for a right-angled orientation in at least a state in which the main body unit is arranged on the power-tool housing, at least one housing abutment surface which runs at least substantially parallel to a support surface of the main body unit. In this way, a precise orientation of the main body unit on the power-tool housing can advantageously be made possible.

It is also proposed that the main body unit of the further hand-held power-tool footplate apparatus has, for a right-angled orientation in at least a state in which the main body unit is arranged on the power-tool housing, at least one further housing abutment surface which runs at least substantially parallel to the support surface of the main body unit. A stable arrangement of the main body unit on the power-tool housing in a right-angled orientation can advantageously be made possible, wherein tilting of the main body unit relative to the power-tool housing can advantageously be prevented or substantially suppressed.

Here, it is not the intention for the hand-held power-tool footplate apparatuses according to the disclosure, the portable power tool according to the disclosure and/or the hand-held power tool system according to the disclosure to be restricted to the usage and embodiment described above. In particular, the hand-held power-tool footplate apparatuses according to the disclosure, the portable power tool according to the disclosure and/or the hand-held power tool system according to the disclosure may, in order to realize a mode of operation described herein, have a number of individual elements, components and units that differs from the number stated herein.

Further advantages will emerge from the following description of the drawing. The drawing illustrates an exemplary embodiment. The drawing, the description and claims contain numerous features in combination. A person skilled in the art will expediently also consider the features individually and combine them to form further meaningful combinations.

BRIEF DESCRIPTION OF THE DRAWINGS

FIG. 6 shows, in a schematic illustration, a further sectional view of the portable power tool according to the disclosure and the further hand-held power-tool footplate apparatus according to the disclosure in a state in which the latter is arranged on the power-tool housing in a pivotable state;

FIG. 7 shows, in a schematic illustration, a further sectional view of the portable power tool according to the disclosure and the further hand-held power-tool footplate apparatus according to the disclosure in a state in which the latter is arranged on the power-tool housing in a fixed state; and FIG. 8 shows a detail view of a fixing unit of the hand-held power-tool footplate apparatus in a schematic illustration.

DETAILED DESCRIPTION

Figure 1:
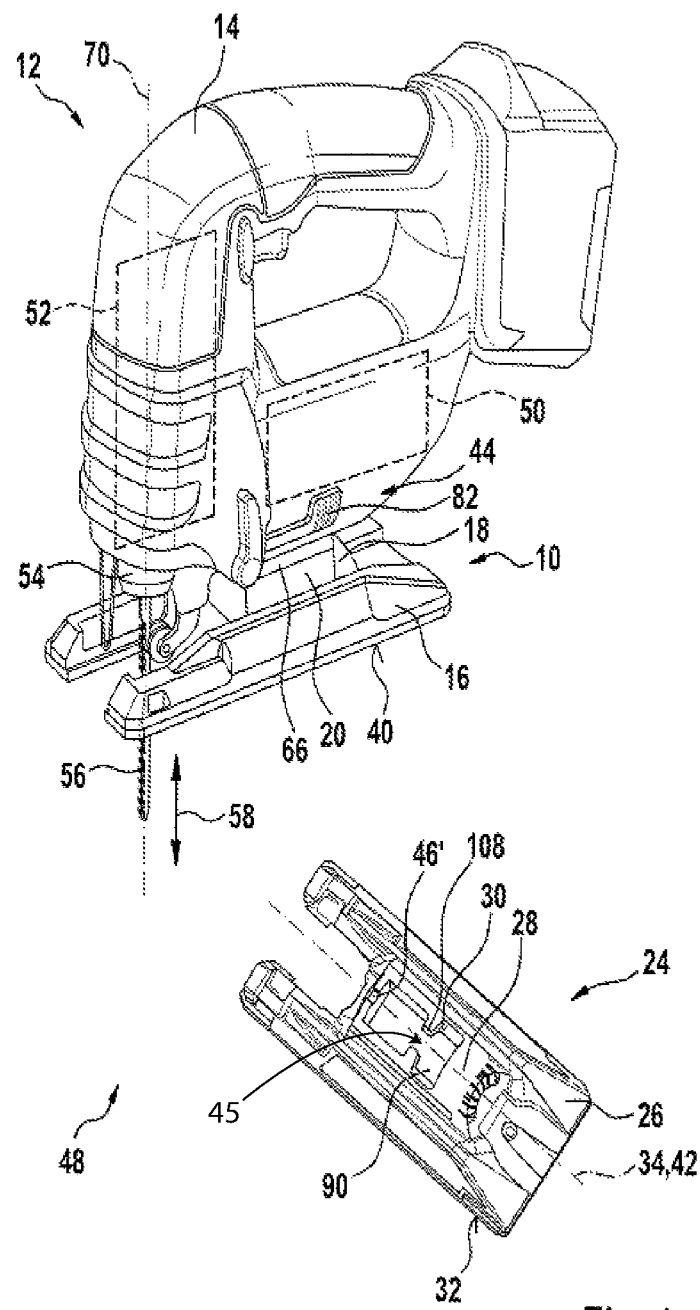
FIG. 1 shows, in a schematic illustration, a hand-held power tool system according to the disclosure having a portable power tool according to the disclosure, the latter comprising a hand-held power-tool footplate apparatus according to the disclosure, and having a further hand-held power-tool footplate apparatus according to the disclosure.

FIG. 1 shows a hand-held power tool system 48 which has at least one portable power tool 12 which comprises at least one hand-held power-tool footplate apparatus 24. Furthermore, the hand-held power tool system 48 has at least one further hand-held power-tool footplate apparatus 10 which can be arranged on a power-tool housing 14 of the portable power tool 12 alternatively to the hand-held power-tool footplate apparatus 24. In FIG. 1, the further hand-held power-tool footplate apparatus 10 is arranged on the portable power-tool housing 14. In FIG. 1, the hand-held power-tool footplate apparatus 24 is illustrated in a state in which it has been dismounted from the power-tool housing 14. The portable power tool 12 is in the form of a jigsaw. Here, the portable power tool 12 has the power-tool housing 14, which encloses a drive unit 50 of the portable power tool 12 and a gearing unit 52 of the portable power tool 12. The drive unit 50 and the gearing unit 52 are provided for driving a machining tool 56, which is clamped in a tool holder 54 of the portable power tool 12, in oscillation. Here, the machining tool 56 is driven in oscillation along a stroke direction 58. Thus, in an operating state, the machining tool 56 performs a stroke movement along the stroke direction 58. The machining tool 56 is in the form of a jigsaw blade. It is however also conceivable for the machining tool 56 to be formed by some other machining tool that appears expedient to a person skilled in the art. Furthermore, the drive unit 50 and the gearing unit 52 are provided for driving the machining tool 56 with a pendular motion along a direction running perpendicular to the stroke direction 58. Thus, in an operating state, the machining tool 56 thus performs a pendular stroke movement.

For support on a workpiece to be machined (not illustrated in any more detail here) for the purpose of machining the workpiece by means of the machining tool 56 arranged in the tool holder 54, the hand-held power-tool footplate apparatus 24 can be arranged on the power-tool housing 14 of the portable power tool 12. The hand-held power-tool footplate apparatus 24 for the portable power tool 12 comprises at least one main body unit 26 which can be arranged removably on the power-tool housing 14 of the portable power tool 12, or a main body, which can be arranged removably on the power-tool housing 14 of the portable power tool 12, of the main body unit 26, which main body unit or main body has at least one housing abutment 28 for abutment against the power-tool housing 14. Furthermore, the main body unit 26 of the hand-held power-tool footplate apparatus 24 comprises at least one clamping surface 94 which is arranged on a side, which faces away from the housing abutment 28, of the main body unit 26 of the hand-held power-tool footplate apparatus 24 (cf. FIGS. 5 to 7). The main body unit 26 of the hand-held power-tool footplate apparatus 24 is in this case designed as a main body unit 26 which, in a state in which the latter is arranged on the power-tool housing 14, is adjustable in terms of position relative to the power-tool housing 14.

Figure 2:
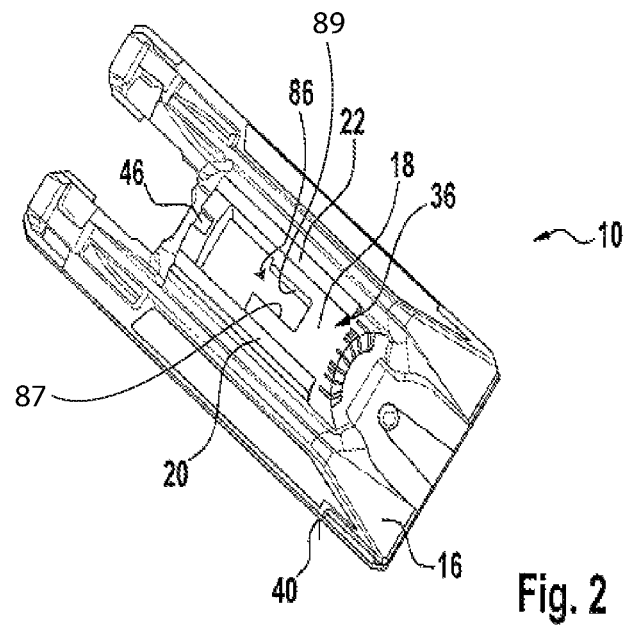
FIG. 2 shows, in a schematic illustration, a detail view of the hand-held power-tool footplate apparatus according to the disclosure.
Figure 3:
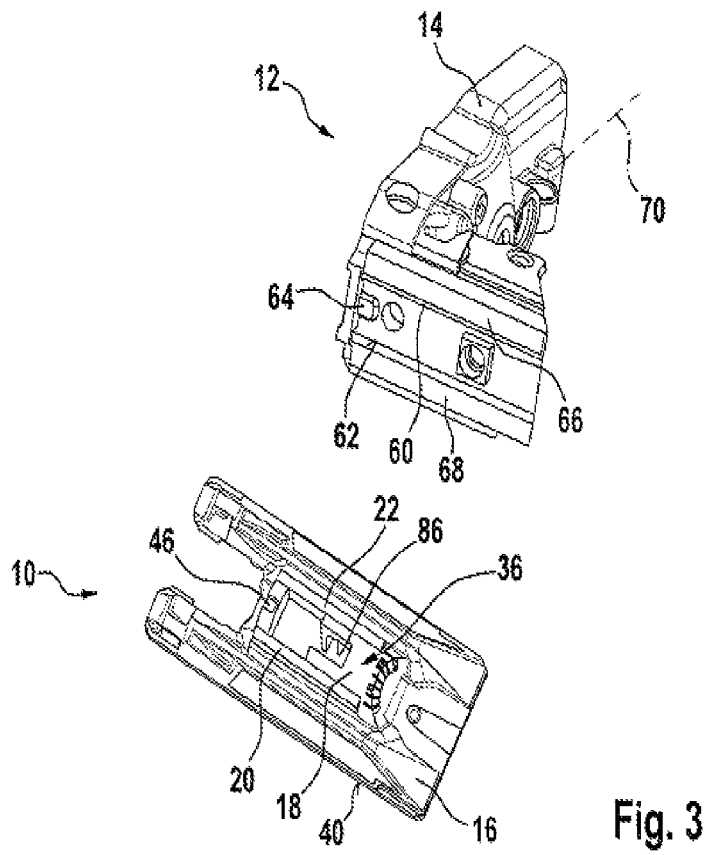
FIG. 3 shows, in a schematic illustration, a detail view of a housing abutment of the hand-held power-tool footplate apparatus according to the disclosure and a counterpart abutment of a power-tool housing of the portable power tool according to the disclosure.
Figure 4:
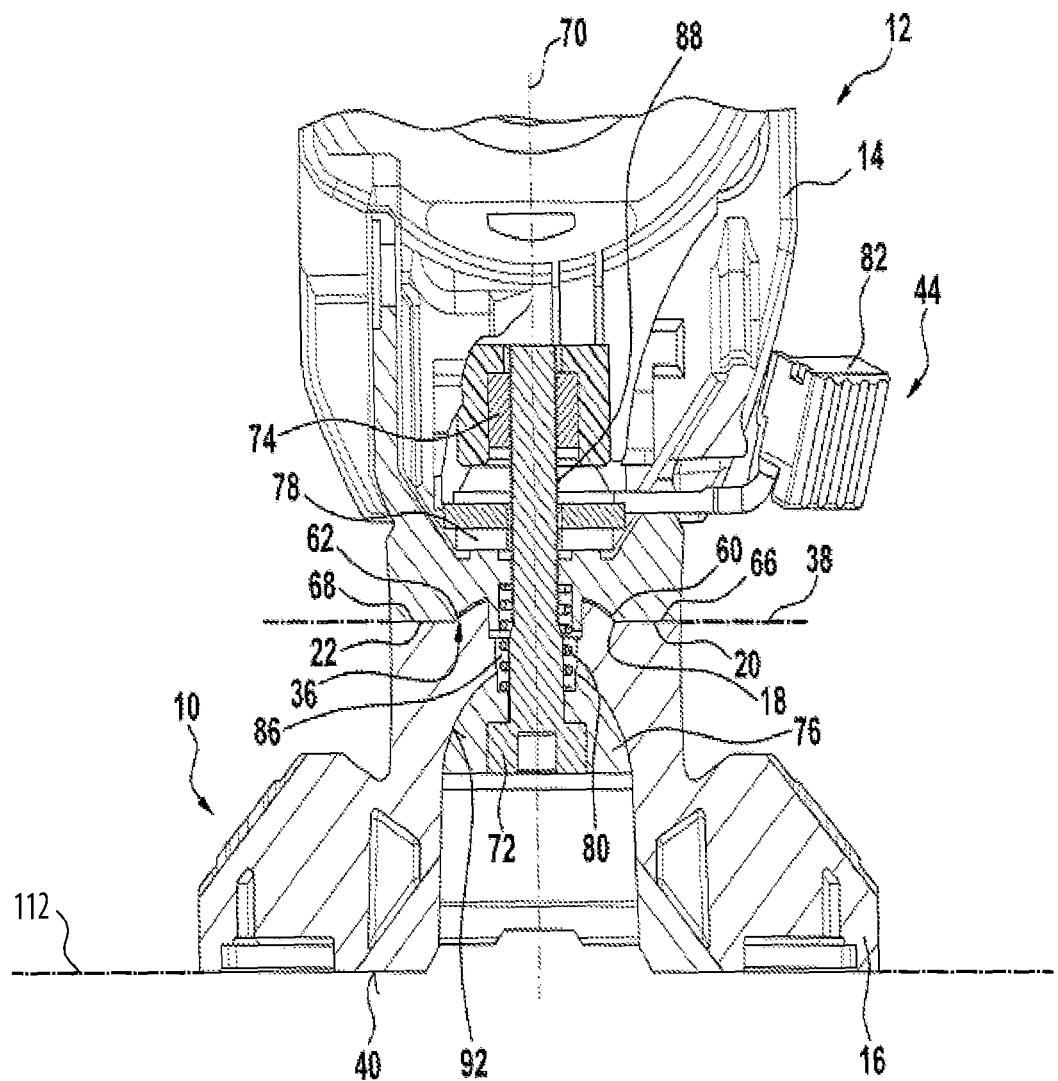
FIG. 4 shows, in a schematic illustration, a sectional view of the portable power tool according to the disclosure and the hand-held power-tool footplate apparatus according to the disclosure in a state in which the latter is arranged on the power-tool housing.

The further hand-held power-tool footplate apparatus 10 likewise comprises at least one main body unit 16 which can be removably arranged on the power-tool housing 14 of the portable power tool 12 and which has at least one housing abutment 18, for abutment against the power-tool housing 14, and at least one clamping surface 92 which is arranged on a side, which faces away from the housing abutment 18, of the main body unit 16 of the further hand-held power-tool footplate apparatus 10. The main body unit 16 of the further hand-held power-tool footplate apparatus 10 is in this case designed as a main body unit 26 which, in a state in which the latter is arranged on the power-tool housing 14, is not adjustable in terms of position relative to the power-tool housing 14. Thus, the main body unit 16 of the further hand-held power-tool footplate apparatus 10 can be arranged on the power-tool housing 14 only in a position defined at least by an interaction of the housing abutment 18 and a counterpart abutment 60, 62 of the power-tool housing 14 (FIGS. 2 to 4).

The housing abutment 18 forms a first housing abutment 18 of the main body unit 16 of the further hand-held power-tool footplate apparatus 10. Here, the housing abutment 18 is formed by a surface of an abutment element, which is in the shape of a segment of a circular cylindrical ring, of the main body unit 16 of the further hand-held power-tool footplate apparatus 10. In at least a state in which the main body unit 16 of the further hand-held power-tool footplate apparatus 10 is arranged on the power-tool housing 14, the abutment element in the shape of a segment of a circular cylindrical ring and thus the housing abutment 18 bears, by way of the surface facing away from a support surface 40 of the main body unit 16, against the counterpart abutment 60, 62 of the power-tool housing 14. As shown in FIG. 4, the support surface 40 defines a support plane 112 that is parallel to the contact plane 38, and the support plane 112 is only orthogonal to the stroke direction 58 when the main body unit 16 is in the right-angled orientation. Here, that surface of the abutment element in the shape of a segment of a circular cylindrical ring which faces away from the support surface 40 of the main body unit 16 of the further hand-held power-tool footplate apparatus 10 is of domed design. Furthermore, that surface of the abutment element in the shape of a segment of a circular cylindrical ring which faces away from the support surface 40 of the main body unit 16 of the further hand-held power-tool footplate apparatus 10 forms the clamping surface 92 of the main body unit 16 of the further hand-held power-tool footplate apparatus 10. Overall, the power-tool housing 14 has two counterpart abutments 60, 62 against which, in at least a state in which the main body unit 16 of the further hand-held power-tool footplate apparatus 10 is arranged on the power-tool housing 14, the housing abutment 18 bears. The counterpart abutments 60, 62 are in the form of abutment surfaces which are designed correspondingly with respect to the abutment element in the shape of a segment of a circular cylindrical ring, and thus with respect to the housing abutment 18. Here, the abutment elements 60, 62 are arranged on a side which faces away from a hand grip region of the power-tool housing 14.

Furthermore, the main body unit 16 of the further hand-held power-tool footplate apparatus 10 has at least one centering element 46 which is provided for centering the main body unit 16 of the further hand-held power-tool footplate apparatus 10 in at least a state in which said main body unit is arranged on the power-tool housing 14. The centering element 46 is in the form of a cam receiving element. Here, the centering element 46 is provided for receiving, in at least a state in which it is arranged on the power-tool housing 14, a cam element 64 of the power-tool housing 14 (FIG. 3). The centering element 46 is of a configuration corresponding to the cam element 64. Here, the centering element 46 has a U-shaped configuration. It is however also conceivable for the centering element 46 to have some other configuration that appears expedient to a person skilled in the art for receiving the cam element 64, such as for example a circular configuration, a polygonal configuration etc. The centering element 46 is arranged on a side, which faces away from the support surface 40, of the main body unit 16 of the further hand-held power-tool footplate apparatus 10 or of the main body of the main body unit 16 of the further hand-held power-tool footplate apparatus 10. In at least a state in which the main body unit 16 of the further hand-held power-tool footplate apparatus 10, or the main body of the main body unit 16 of the further hand-held power-tool footplate apparatus 10, is arranged on the power-tool housing 14, the cam element 64 engages in positively locking fashion into the centering element 46.

The main body unit 16 of the further hand-held power-tool footplate apparatus 10 also has, for a right-angled orientation in at least a state in which the main body unit 16 of the further hand-held power-tool footplate apparatus 10 is arranged on the power-tool housing 14, at least one housing abutment surface 20 which runs at least substantially parallel to a support surface 40 of the main body unit 16 of the further hand-held power-tool footplate apparatus 10. The housing abutment surface 20 in this case forms a second housing abutment of the main body unit 16 of the further hand-held power-tool footplate apparatus 10 or of the main body of the main body unit 16 of the further hand-held power-tool footplate apparatus 10. Furthermore, the housing abutment surface 20 is designed differently from the centering element 46. The housing abutment surface 20 is arranged on that side of the main body unit 16 of the further hand-held power-tool footplate apparatus 10 which faces away from the support surface 40. Furthermore, the housing abutment surface 20 is arranged outside an abutment region 36, in which the housing abutment 18 is arranged, of the main body unit 16 of the further hand-held power-tool footplate apparatus 10. The housing abutment surface 20 extends in a contact plane 38 of the main body unit 16 of the further hand-held power-tool footplate apparatus 10, in which plane, in at least a state in which said main body unit is arranged on the power-tool housing 14, the main body unit 16 of the further hand-held power-tool footplate apparatus 10 bears against the power-tool housing 14 at at least two points (FIG. 4).

The main body unit 16 of the further hand-held power-tool footplate apparatus 10 furthermore has, for a right-angled orientation in at least a state in which the main body unit 16 of the further hand-held power-tool footplate apparatus 10 is arranged on the power-tool housing 14, at least one further housing abutment surface 22 which runs at least substantially parallel to the support surface 40 of the main body unit 16 of the further hand-held power-tool footplate apparatus 10. Furthermore, the further housing abutment surface 22 is arranged outside the abutment region 36, in which the housing abutment 18 is arranged, of the main body unit 16 of the further hand-held power-tool footplate apparatus 10. The further housing abutment surface 22 extends in the contact plane 38 of the main body unit 16 of the further hand-held power-tool footplate apparatus 10, in which plane, in at least a state in which said main body unit is arranged on the power-tool housing 14, the main body unit 16 of the further hand-held power-tool footplate apparatus 10 bears against the power-tool housing 14 at at least two points (FIG. 4). Here, the further housing abutment surface 22 forms a third housing abutment of the main body unit 16 of the further hand-held power-tool footplate apparatus 10. The housing abutment surface 20 and the further housing abutment surface 22 are of at least substantially analogous configuration. The housing abutment surface 20 and the further housing abutment surface 22 are arranged, spaced apart from one another, on the main body unit 16 of the further hand-held power-tool footplate apparatus 10 or on the main body of the main body unit 16 of the further hand-held power-tool footplate apparatus 10.

The power-tool housing 14 comprises in each case one main body counterpart abutment 66, 68 for abutment against the housing abutment surface 20 and against the further housing abutment surface 22. The main body counterpart abutments 66, 68 are in the form of abutment surfaces which are designed correspondingly to the housing abutment surface 20 and to the further housing abutment surface 22 respectively. Here, the main body counterpart abutments 66, 68 are arranged on the side facing away from the hand grip region of the power-tool housing 14. Furthermore, the main body counterpart abutments 66, 68 which are in the form of abutment surfaces extend at least substantially transversely with respect to the counterpart abutments 60, 62 of the power-tool housing 14. Here, the main body counterpart abutments 66, 68 which are in the form of abutment surfaces extend at least substantially perpendicular to a vertical axis 70 of the power-tool housing 14. The vertical axis 70 of the power-tool housing 14 runs at least substantially parallel to the stroke direction 58. Interaction of the housing abutment 18, the housing abutment surface 20 and the further housing abutment surface 22 in at least a state in which the main body unit 16 of the further hand-held power-tool footplate apparatus 10 is arranged on the power-tool housing 14 gives rise to a situation in which the main body unit 16 of the further hand-held power-tool footplate apparatus 10 abuts against the counterpart abutments 60, 62 and against the main body counterpart abutments 66, 68 at at least three points.

Furthermore, the further hand-held power-tool footplate apparatus 10 and/or the hand-held power-tool footplate apparatus 24 has at least one fixing unit 44 which is provided such that, by generating a fixing force, which acts on the main body unit 16 of the further hand-held power-tool footplate apparatus 10 and which is oriented in the direction of the power-tool housing 14, said fixing unit fixes the main body unit 16 of the further hand-held power-tool footplate apparatus 10 to the power-tool housing 14 (FIGS. 4 to 8). It is however also conceivable for the further hand-held power-tool footplate apparatus 10 or the hand-held power-tool footplate apparatus 24 to be formed without a fixing unit 44, and for the portable power tool 12 to at least partially comprise the fixing unit 44. The fixing unit 44 is provided for fixedly clamping the main body unit 16 of the further hand-held power-tool footplate apparatus 10 or the main body of the main body unit 16 of the further hand-held power-tool footplate apparatus 10 to the power-tool housing 14. For this purpose, the fixing unit 44 comprises at least one holding element 72 which is provided for holding the main body unit 16 captively on the power-tool housing 14 when the holding element 72 is in an installed state. The holding element 72 is in the form of a screw which can be screwed into a threaded element 74 of the fixing unit 44. Here, the threaded element 74 is in the form of a nut which can be arranged in a recess of the power-tool housing 14. The threaded element 74 is mounted so as to be movable in translational fashion in the recess, in particular in translational fashion along a movement axis, which runs at least substantially parallel to the vertical axis 70, of the threaded element 74. It is however also conceivable for the threaded element 74 to have some other configuration that appears expedient to a person skilled in the art, for example a configuration as a threaded recess which is formed directly into an element arranged movably in the power-tool housing 14, etc.

Figure 5:
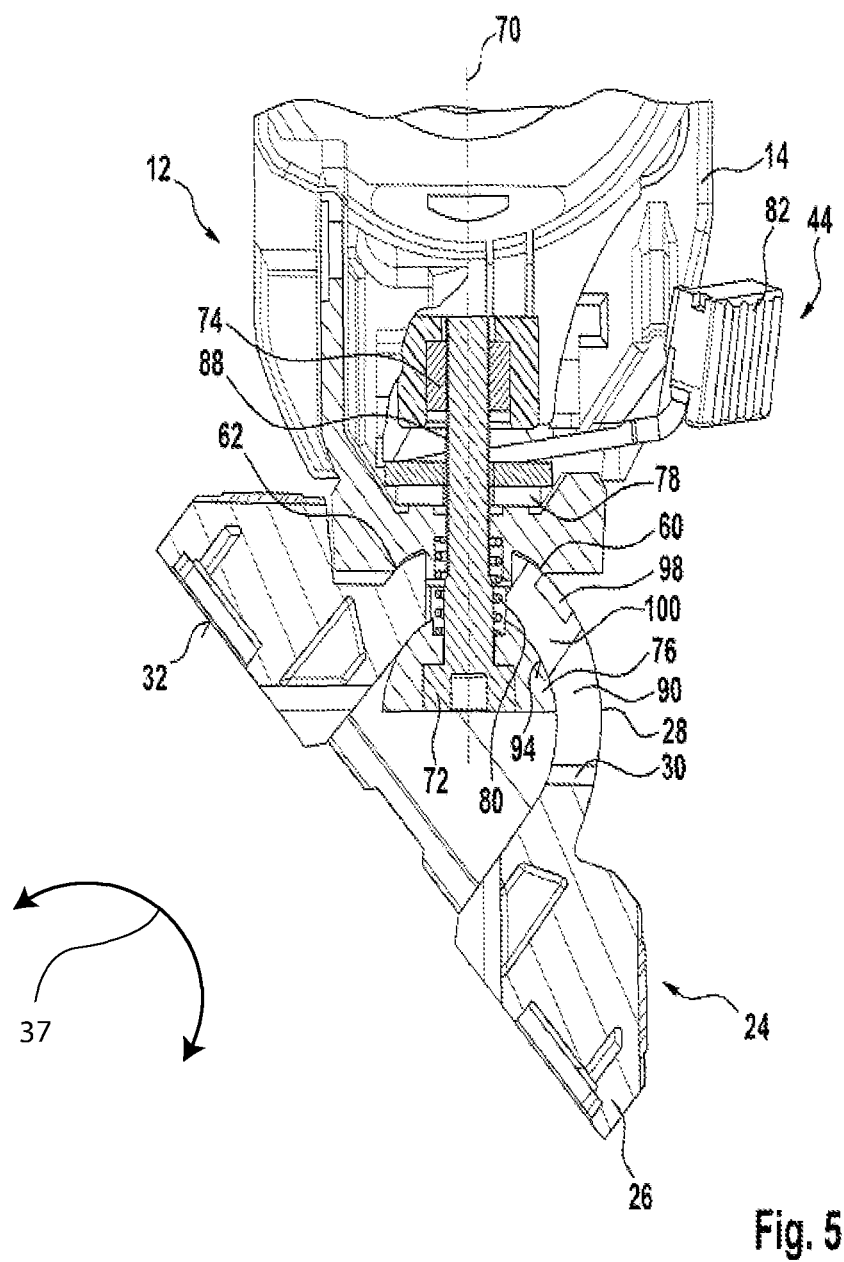
FIG. 5 shows, in a schematic illustration, a sectional view of the portable power tool according to the disclosure and the further hand-held power-tool footplate apparatus according to the disclosure in a state in which the latter is arranged on the power-tool housing.

Furthermore, the fixing unit 44 comprises a fixing element 76 which is provided for fixing the main body unit 16 of the further hand-held power-tool footplate apparatus 10 to the power-tool housing 14. For this purpose, the fixing unit 44 also comprises a further fixing element 78 which interacts with the fixing element 76 in order to fixedly clamp the main body unit 16 of the further hand-held power-tool footplate apparatus 10. The fixing element 76 and the further fixing element 78 are each formed as clamping elements. Thus, the fixing unit 44 is in the form of a clamping unit. The fixing element 76 is in the form of a semi-cylindrical clamping element. The further fixing element 78 is in the form of a clamping plate which is arranged in the power-tool housing 14. Furthermore, the fixing unit 44 has a spring element 80 which, in an installed state, exerts on the fixing element 76 a spring force that acts in a direction facing away from the further fixing element 78. The spring element 80 is in the form of a compression spring. It is however also conceivable for the spring element 80, in an alternative embodiment of the fixing unit 44, to be in the form of a tension spring. To generate a spring force that acts on the fixing element 76, the spring element 80 is supported by way of one end on the power-tool housing 14, and the spring element 80 is supported by way of a further end on the fixing element 76. For a movement of the fixing element 76 and/or of the further fixing element 78 into a release position and/or into a clamping position, the fixing unit 44 has at least one operating element 82 (FIGS. 1, 4 and 5). The operating element 82 is in the form of an operating lever. Here, the operating element 82 is mounted on the power-tool housing 14 so as to be pivotable, in particular pivotable about a pivot axis, which runs at least substantially parallel to the vertical axis 70, of the operating element 82.

The operating element 82 furthermore has at least one movement cam 104 (FIG. 8) which is provided to interact, in a manner already known to a person skilled in the art, with at least one movement cam 106 of the further fixing element 78 (FIG. 8) for the purpose of moving the fixing element 76 and/or the further fixing element 78 into a release position and/or into a clamping position. The movement cam 104 of the operating element 82 and the movement cam 106 of the further fixing element 78 are of ramp-shaped form. Here, a sliding movement of the movement cam 104 on the movement cam 106 of the further fixing element 78 is effected, in a manner already known to a person skilled in the art, by way of a pivoting movement of the operating element 82 in a first direction. This effects a translational movement of the fixing element 76 relative to the further fixing element 78 in a direction facing away from the power-tool housing 14. The translational movement of the fixing element 76 is effected by the spring force of the spring element 80 during a movement into a release position. Here, the threaded element 74 is likewise moved in translational fashion, in particular in translational fashion along a direction running at least substantially parallel to the vertical axis 70. A sliding movement of the movement cam 104 of the operating element 82 on the movement cam 106 of the further fixing element 78 is effected, in a manner already known to a person skilled in the art, in the event of a pivoting movement of the operating element 82 in a second direction running oppositely to the first direction. This effects a translational movement of the fixing element 76 relative to the further fixing element 78 in a direction which faces toward the power-tool housing 14 and which opposes the spring force of the spring element 80, causing the main body unit 16 of the further hand-held power-tool footplate apparatus 10 to be fixedly clamped to the power-tool housing 14. For this purpose, the fixing element 76 bears against the clamping surface 92, which faces toward the support surface 40, of the abutment element, which is in the shape of a segment of a circular cylindrical ring, of the main body unit 16. Thus, the fixing element 76, in an installed state, is arranged on the clamping surface 92, which faces toward the support surface 40, of the abutment element, which is in the shape of a segment of a circular cylindrical ring, of the main body unit 16. Furthermore, the further fixing element 78 bears against an inner side, which faces away from the counterpart abutments 60, 62, of the power-tool housing 14. In an installed state, the holding element 72, proceeding from the clamping surface 92, which faces toward the support surface 40, of the abutment element, the latter being in the shape of a segment of a circular cylindrical ring, of the main body unit 16 of the further hand-held power-tool footplate apparatus 10, extends through the further fixing element 78, through a receiving opening 86 of the main body unit 16 of the further hand-held power-tool footplate apparatus 10, through the fixing element 76, through a pivot shaft receiving opening 88 of the operating element 82, and into the threaded element 74. The receiving opening 86 is at least partially defined by a first pivot locking stop 87 and a second pivot locking stop 89, which are also referred to herein as locking stop 87 and locking stop 89.

For an exchange of the further hand-held power-tool footplate apparatus 10 for the hand-held power-tool footplate apparatus 24, or vice versa, the holding element 72 is unscrewed from the threaded element 74 into a release position of the fixing element 76 and/or of the further fixing element 78. The fixing element 76 and the spring element 80 can then be removed together with the holding element 72. It is thereby possible for the hand-held power-tool footplate apparatus 24 to be arranged on the power-tool housing 14 alternatively to the further hand-held power-tool footplate apparatus 10. The hand-held power-tool footplate apparatus 24 for the portable power tool 12 comprises at least one main body unit 26 which can be removably arranged on the power-tool housing 14 of the portable power tool 12 and which has at least one housing abutment 28 for abutment against the power-tool housing 14. Furthermore, the main body unit 26 of the hand-held power-tool footplate apparatus 24 comprises at least clamping surface 94 which is arranged on a side, which faces away from the housing abutment 28, of the main body unit 26 of the hand-held power-tool footplate apparatus 24. Here, the main body unit 26 of the hand-held power-tool footplate apparatus 24 is designed as a main body unit which, in a state in which the latter is arranged on the power-tool housing 14, is adjustable in terms of position relative to the power-tool housing 14. Thus, the main body unit 26 of the hand-held power-tool footplate apparatus 24 is mounted pivotably on the power-tool housing 14, in a manner already known to a person skilled in the art (FIG. 5), by means of an interaction of the housing abutment 28 and the counterpart abutments 60, 62 of the power-tool housing 14 and the fixing element 76 and the clamping surface 94, said clamping surface facing toward a support surface 32 of the main body unit 26 and belonging to an abutment element, which forms the housing abutment 18 and which is in the shape of a segment of a circular cylindrical ring, of the main body unit 26 of the hand-held power-tool footplate apparatus 24. The main body unit 26 of the hand-held power-tool footplate apparatus 24 is, in order to permit the pivotable mounting in relation to the main body unit 16 of the further hand-held power-tool footplate apparatus 10, designed to be decoupled from the housing abutment surface 20 and the further housing abutment surface 22. Furthermore, the main body unit 26 of the hand-held power-tool footplate apparatus 24 comprises at least one bearing element 30 which is provided such that, by means thereof, the main body unit 26 of the hand-held power-tool footplate apparatus 24 is, in at least a state in which said main body unit is arranged on the power-tool housing 14, mounted so as to be pivotable about a pivot axis 42 that runs at least substantially parallel to the support surface 32. The bearing element 30 is in the form of a receiving opening 90 of the main body unit 26 of the hand-held power-tool footplate apparatus 24, in which receiving opening a guide projection 84 of the fixing element 76 is at least partially guided (FIGS. 1, 6 and 7). Here, the edge regions that border the receiving opening 90 form guide surfaces or abutment surfaces for the guide projection 84.

Furthermore, the main body unit 26 of the hand-held power-tool footplate apparatus 24 comprises at least one bearing element 30 which is provided such that, by means thereof, the main body unit 26 of the hand-held power-tool footplate apparatus 24 is, in order to permit a movement into a pivot angle locking position and/or into a pivot angle adjustment position, mounted so as to be movable in translational fashion along a movement axis 34 that runs at least substantially parallel to the support surface 32 of the main body unit 26 of the hand-held power-tool footplate apparatus 24. Here, the bearing element 30 serves for mounting the main body unit 26 of the hand-held power-tool footplate apparatus 24 such that, in a release position of the fixing element 76 and/or of the further fixing element 78, said main body unit is movable in translational fashion relative to the power-tool housing 14. The movement axis 34 of the main body unit 26 of the hand-held power-tool footplate apparatus 24 runs, in at least a state in which said main body unit is arranged on the power-tool housing 14, at least substantially perpendicular to the vertical axis 70. Here, the movement axis 34 of the main body unit 26 of the hand-held power-tool footplate apparatus 24 and the pivot axis 42 of the main body unit 26 of the hand-held power-tool footplate apparatus 24 run coaxially. To permit a movement of the main body unit 26 of the hand-held power-tool footplate apparatus 24, the bearing element 30 has a larger diameter than the guide projection 84 (FIGS. 6 and 7).

The main body unit 26 of the hand-held power-tool footplate apparatus 24 likewise comprises a centering element 46' which is provided for centering the main body unit 26 of the hand-held power-tool footplate apparatus 24 in at least a state in which said main body unit is arranged on the power-tool housing 14. In a central position of the main body unit 26 of the hand-held power-tool footplate apparatus 24, in which a tool movement plane runs perpendicular to the support surface 32 of the main body unit 26 of the hand-held power-tool footplate apparatus 24, a translational movement of the main body unit 26 of the hand-held power-tool footplate apparatus 24 is possible by means of the bearing element 30 when the fixing element 76 and/or the further fixing element 78 are/is in a release position. Here, as a result of the translational movement along the movement axis 34, a positively locking connection is produced between the cam element 64 and the centering element 46. Thus, by means of an interaction of the housing abutment 18, the counterpart abutments 60, 62, the centering element 46', the cam element 64, the fixing element 76 and the inner side of the abutment element which is in the shape of a segment of a circular cylindrical ring, a situation is realized in which the main body unit 26 of the hand-held power-tool footplate apparatus 24 abuts against the power-tool housing 14 at multiple points. Owing to the multi-point abutment of the main body unit 26 of the hand-held power-tool footplate apparatus 24 against the power-tool housing 14 in the central position, the main body unit 26 of the hand-held power-tool footplate apparatus 24 is, in the central position, fixed to the power-tool housing 14 so as not to be adjustable in terms of position. Here, the main body unit 26 of the hand-held power-tool footplate apparatus 24 has, for a right-angled orientation in at least a state in which the main body unit 26 of the hand-held power-tool footplate apparatus 24 is arranged on the power-tool housing 14, a multi-point position fixing unit 45 which, for pivot angle locking of the main body unit 26 of the hand-held power-tool footplate apparatus 24, has at least two pivot locking stops 96, 98, 100 that differ from one another. For this purpose, the fixing unit 44 comprises at least the fixing element 76 that interacts with the clamping surface 94 of the main body unit 26 of the hand-held power-tool footplate apparatus 24, which fixing element has at least one locking projection 102 for locking the main body unit 26 in at least one angular position relative to the power-tool housing 14 by means of a positively locking connection that acts along a pivoting direction 37 (FIG. 5) of the main body unit 26 of the hand-held power-tool footplate apparatus 24. In at least one angular position of the main body unit 26 of the hand-held power-tool footplate apparatus 24 relative to the power-tool housing 14, the locking projection 102 bears against at least one of the pivot locking stops 96, 98, 100. The locking projection 102 is formed integrally with the fixing element 76. Here, the locking projection 102 bears against the pivot locking stop 100 which is arranged on the bearing element 30 at a side facing toward the support surface 32 of the main body unit 26 of the hand-held power-tool footplate apparatus 24. The pivot locking stop 100 against which the locking projection 102 bears in at least one state is in the form of a recess.

Furthermore, the centering element 46' forms at least one of the pivot locking stops 96, 98, 100. In this way, in the central position of the main body unit 26 of the hand-held power-tool footplate apparatus 24, the cam element 64 of the portable power tool 12 bears, as a result of a translational movement into the pivot angle locking position, against the centering element 46' which is formed as pivot locking stop 96. Furthermore, in the central position of the main body unit 26 of the hand-held power-tool footplate apparatus 24, the guide projection 84 bears, as a result of a translational movement into the pivot angle locking position, against one of the pivot locking stops 96, 98, 100 so as to realize the multi-point abutment. Here, the guide projection 84 bears against that pivot locking stop 98 of the pivot locking stops 96, 98, 100 which is arranged in an edge region that borders the receiving opening 90 of the main body unit 26 of the hand-held power-tool footplate apparatus 24. The pivot locking stop 98 against which guide projection 84 bears in at least one state is in the form of a recess.

After a release of the fixing unit 44, a translational movement of the main body unit 26 of the hand-held power-tool footplate apparatus 24 from the pivot angle locking position into the pivot angle adjustment position is possible. Here, the guide projection 84, in the pivot angle adjustment position, bears against a pivot angle adjustment stop 108 of the main body unit 26 of the hand-held power-tool footplate apparatus 24 or, during an adjustment of an angular position of the main body unit 26 of the hand-held power-tool footplate apparatus 24 relative to the power-tool housing 14, slides along the pivot angle adjustment stop 108. Furthermore, in the pivot angle adjustment position, it is possible for the hand-held power-tool footplate apparatus 24 to be dismounted by hand by virtue of the holding element 72 being unscrewed from the threaded element 74 after a release of the fixing unit 44.

What is claimed is:
1. A hand-held jigsaw power tool system, comprising:
a portable power-tool including a power-tool housing, the portable power-tool configured to drive a machining tool in oscillation along a stroke direction that is parallel to a vertical axis of the portable power-tool housing, the power-tool housing including a first counterpart abutment located entirely in a contact plane, a second counterpart abutment located entirely in the contact plane, and a curved counterpart abutment located directly between the first counterpart abutment and the second counterpart abutment;
a first footplate apparatus that includes at least one main body unit positionable on the power-tool housing in only a right-angled orientation, the at least one main body unit including:
a first support surface configured to support the portable power-tool housing on a workpiece;

a first housing abutment surface located entirely in the contact plane and configured to abut the first counterpart abutment when the at least one main body unit is positioned on the power-tool housing to prevent movement of the at least one main body unit to any orientation other than the right-angled orientation, the first housing abutment surface parallel to the first support surface;

a second housing abutment surface located entirely in the contact plane and configured to abut the second counterpart abutment when the at least one main body unit is positioned on the power-tool housing to prevent movement of the at least one main body unit to any orientation other than the right-angled orientation, the second housing abutment surface parallel to the first support surface, and the second housing abutment surface configured to abut the second counterpart abutment when the first housing abutment surface abuts the first counterpart abutment;

a second interchangeable footplate apparatus including at least one further main body unit positionable on the power-tool housing in a plurality of angular orientations, the at least one further main body unit including:

a third housing abutment surface which is in a shape of a segment of a circular cylindrical ring, the third housing abutment surface configured to abut the corresponding curved third counterpart abutment of the power tool housing in the plurality of angular orientations, wherein the first support surface of the at least one main body unit of the first footplate apparatus defines a support plane that is only orthogonal to the stroke direction when the at least one main body unit of the first footplate apparatus is positioned in the right-angled orientation, and wherein the first support surface is always parallel to the contact plane when the at least one main body unit of the first footplate apparatus is positioned on the power-tool housing.

2. The hand-held jigsaw power-tool system according to claim 1, wherein the second interchangeable footplate apparatus further comprises:

at least one bearing element configured to mount the at least one further main body unit to the power-tool housing, and further configured to permit movement of the second interchangeable footplate apparatus into at least one of:

a pivot angle locking position in which the second interchangeable footplate apparatus is fixed in position relative to a pivoting axis of the second interchangeable footplate apparatus; and a pivot angle adjustment position in which the second interchangeable footplate apparatus is pivotable about the pivoting axis, wherein the at least one bearing element is configured to translate along a movement axis that runs at least parallel to the second support surface and the pivoting axis.

3. The hand-held jigsaw power-tool system according to claim 1, wherein:

the at least one main body unit further includes
a fixing unit configured to position the at least one main body unit in only the right-angled orientation when the at least one main body unit is positioned on the power-tool housing, and at least one clamping surface located on a side of the at least one main body unit facing away from the first housing abutment surface and the second housing abutment surface, the fixing unit is configured to generate a fixing force, via interaction with the at least one clamping surface, that acts on the at least one main body unit and that is oriented in a direction of the portable power-tool housing, for connecting the at least one main body unit to the portable power-tool housing.

4. The hand-held jigsaw power-tool system according to claim 1, wherein:

the second interchangeable footplate apparatus further includes
a multi-point position fixing unit configured to fix the at least one further main body unit in a selected angular orientation of the plurality of angular orientations when the at least one further main body unit is positioned on the power-tool housing, and including a fixing element having at least one locking projection, at least two locking stops formed in the at least one further main body unit that differ from each other, the at least one locking projection configured to abut at least one of the at least two locking stops when the at least one further main body unit is positioned on the portable power-tool housing.

5. The hand-held jigsaw power-tool system according to claim 1, wherein the at least one main body unit further includes:

a centering element located directly between the first and the second housing abutment surfaces, the centering element configured to receive a post structure of the portable power-tool housing in positively locking fashion to further prevent movement of the at least one main body unit to any orientation other than the right-angled orientation when the at least one main body unit is positioned on the portable power-tool housing, wherein the centering element is configured as a recess, and wherein the post structure is located in the recess when the at least one main body unit is positioned on the portable power-tool housing.

\* \* \* \* \*

UNITED STATES PATENT AND TRADEMARK OFFICE
CERTIFICATE OF CORRECTION

PATENT NO. : 10,226,827 B2
APPLICATION NO. : 14/274864
DATED : March 12, 2019
INVENTOR(S) : Ferdinand Emch Page 1 of 1

It is certified that error appears in the above-identified patent and that said Letters Patent is hereby corrected as shown below:

In the Claims

In Column 15, Lines 6-8, of Claim 1 should read:
to any orientation other than the right-angled orientation, the first housing abutment surface parallel to the first support surface; and In Column 15, Lines 26-29, of Claim 1 should read:
housing abutment surface configured to abut the corresponding curved counterpart abutment of the power tool housing in the plurality of angular orientations, Signed and Sealed this
Tenth Day of September, 2019

Andrei Iancu
*Director of the United States Patent and Trademark Office*